(12) United States Patent
Santhosh et al.

(10) Patent No.: US 10,270,338 B2
(45) Date of Patent: Apr. 23, 2019

(54) SHUNT REGULATOR INCLUDING RAMP CONTROL CIRCUIT

(71) Applicant: TEXAS INSTRUMENTS INCORPORATED, Dallas, TX (US)

(72) Inventors: Kumar G. Santhosh, Bangalore (IN); Xiadong Cai, Plano, TX (US); Aditya Ambardar, Allen, TX (US); Rahul Mishra, Secunderabad (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/878,594

(22) Filed: Jan. 24, 2018

(65) Prior Publication Data

US 2019/0089246 A1 Mar. 21, 2019

Related U.S. Application Data

(60) Provisional application No. 62/611,311, filed on Dec. 28, 2017.

(30) Foreign Application Priority Data

Sep. 19, 2017 (IN) .............................. 201741033181

(51) Int. Cl.
*H02M 1/00* (2006.01)
*H02M 3/157* (2006.01)
(52) U.S. Cl.
CPC .............. *H02M 3/157* (2013.01); *H02M 1/00* (2013.01); *H02M 2001/0012* (2013.01); *H02M 2001/0025* (2013.01)

(58) Field of Classification Search
CPC . H02M 2001/0003; H02M 2001/0025; H02M 2001/0006; H02M 2001/0012; H02M 1/08; H02M 3/157
USPC ......................................................... 323/288
See application file for complete search history.

(56) References Cited

U.S. PATENT DOCUMENTS

| 9,354,645 B2* | 5/2016 | Priel ......................... G05F 1/56 |
| 2006/0158165 A1* | 7/2006 | Inn .......................... G05F 1/575 |
| | | 323/280 |
| 2007/0120544 A1* | 5/2007 | Ritter ...................... G05F 1/575 |
| | | 323/281 |
| 2012/0068737 A1* | 3/2012 | Tuten .................... H02M 3/157 |
| | | 327/50 |
| 2013/0120891 A1* | 5/2013 | Truong ................... H02M 1/32 |
| | | 361/93.9 |

(Continued)

*Primary Examiner* — Alex Torres-Rivera
(74) *Attorney, Agent, or Firm* — Tuenlap Chan; Charles A. Brill; Frank D. Cimino (57) ABSTRACT

In some examples, a shunt regulator includes a plurality of selection pins configured to receive a digital signal. The shunt regulator also includes an internal reference voltage selection circuit coupled to the plurality of selection pins, the internal reference voltage selection circuit configured to select a first internal reference voltage of the shunt regulator based on the digital signal. The shunt regulator further includes a soft ramp control circuit coupled to the internal reference voltage selection circuit and to a soft ramp control pin that is configured to carry a second internal reference voltage, the soft ramp control circuit configured to compare the first and the second internal reference voltages to generate a soft ramp control output signal.

17 Claims, 3 Drawing Sheets

(56) References Cited

U.S. PATENT DOCUMENTS

| | | | | |
|---|---|---|---|---|
| 2014/0253072 A1* | 9/2014 | Hussien | ............... | H02M 1/36 |
| | | | | 323/281 |
| 2015/0194880 A1* | 7/2015 | Wibben | ............... | H02M 3/156 |
| | | | | 323/282 |
| 2015/0364998 A1* | 12/2015 | North | ............... | H03K 17/133 |
| | | | | 323/271 |
| 2016/0126839 A1* | 5/2016 | Chakkirala | ............... | H02M 3/158 |
| | | | | 323/271 |

* cited by examiner

SHUNT REGULATOR INCLUDING RAMP CONTROL CIRCUIT

CROSS-REFERENCE TO RELATED APPLICATIONS

The present application claims priority to U.S. Provisional Patent Application No. 62/611,311, which was filed Dec. 28, 2017, is titled "Shunt Regulator Including Ramp Control Circuit" and Indian Provisional Patent Application No. 201741033181, which was filed Sep. 19, 2017, is titled "Method to Control Voltage Reference Transition Rate," and are hereby incorporated herein by reference in their entirety.

BACKGROUND

Modern electronic devices, such as smartphones, laptops, etc., may include batteries that are configured to be charged with a direct current (DC) supply. In some cases, an alternating current (AC) supply may be available to charge the electronic device. In such cases, an adapter may be used to convert the available form of the supply voltage to a DC supply that is compatible with the electronic device.

SUMMARY

According to an example, a shunt regulator includes a plurality of selection pins configured to receive a digital signal. The shunt regulator also includes an internal reference voltage selection circuit coupled to the plurality of selection pins, the internal reference voltage selection circuit configured to select a first internal reference voltage of the shunt regulator based on the digital signal. The shunt regulator further includes a soft ramp control circuit coupled to the internal reference voltage selection circuit and to a soft ramp control pin that is configured to carry a second internal reference voltage, the soft ramp control circuit configured to compare the first and the second internal reference voltages to generate a soft ramp control output signal.

According to another example, a shunt regulator includes a plurality of selection pins configured to receive a digital signal. The shunt regulator also includes an internal reference voltage selection circuit coupled to the plurality of the selection pins, the internal reference voltage selection circuit configured to select a first internal reference voltage of the shunt regulator based on the digital signal received by the plurality of selection pins. The shunt regulator further includes a soft ramp control circuit coupled to a soft ramp control pin that is configured to receive a second internal reference voltage and generate a soft ramp control output signal. The soft ramp control circuit includes a comparison circuit configured to receive and compare the first internal reference voltage and the second internal reference voltage. The soft ramp control circuit also includes a current limited buffer coupled to the comparison circuit and configured to change the second internal reference voltage to a third internal reference voltage at the soft ramp control pin in response to the comparison.

According to yet another example, a method includes receiving, by a controller coupled to a plurality of selection pins, a digital signal. The method also includes selecting, by an internal reference voltage selection circuit coupled to the plurality of selection pins, a first internal reference voltage based on the digital signal. The method further includes receiving, by a soft ramp control circuit coupled to a soft ramp control pin and to the internal reference voltage selection circuit, a second internal reference voltage at the soft ramp control pin. The method then includes transitioning, by a current limited buffer present in the soft ramp control circuit, the second internal reference voltage to a third internal reference voltage.

According to yet another example, a shunt regulator includes an internal reference voltage selection circuit coupled to the plurality of the selection pins. The shunt regulator also includes a soft ramp control circuit coupled to the internal reference voltage selection circuit and to a soft ramp control pin. The soft ramp control circuit comprises a comparison circuit and a current limited buffer, the current limited buffer coupled to the comparison circuit and to a capacitor.

BRIEF DESCRIPTION OF THE DRAWINGS

For a detailed description of various examples, reference will now be made to the accompanying drawings in which.

DETAILED DESCRIPTION

In some cases, a flyback converter is used to transform an input AC signal to an output DC signal. A flyback converter may also be used to convert an input DC signal to a transformed output DC signal (e.g., converting a 5V DC input to 12V DC output). In some cases, a control scheme (e.g., voltage mode control) may be used to control the output of a flyback converter. The control scheme may need a feedback related to the output of the flyback converter to perform the control function. In some cases, the feedback may be provided to a regulator circuit (or shunt regulator circuit) coupled to the flyback converter. For instance, if the output of a flyback converter is 5.1V and the desired output is 5V, the shunt regulator circuit may receive a feedback (related to the 5.1V) from the flyback converter and generate an error signal (e.g., error current) to correct the deviance from the desired voltage.

In some cases, a flyback converter may be configured to provide multiple different output voltages, e.g., 5/7/9/12/15/19/20/24V. To support different output voltages, a flyback converter may employ a resistor circuit (e.g., resistor divider) in conjunction with the shunt regulator to control the output voltage of the flyback converter. Stated another way, as the electronic equipment coupled to the power adapter changes, the desired output voltage of the flyback converter changes. This change may be initiated by changing the resistor ratio of the resistor circuit, which may signal the change to the shunt regulator circuit. The shunt regulator may be further configured to change the output of the flyback converter by sending a signal to the flyback converter, which may facilitate transitioning from the present output voltage to the desired output voltage. For example, a Universal Serial Bus (USB) Type-C power adapter may need to charge a laptop that may need a 12V DC supply charge, with the present output of the power adapter set at 5V DC. In such a case, the flyback converter may need to transition from the present voltage output of 5V to the new voltage output of 12V. As noted above, this transition may occur through the shunt regulator circuit that may be configured to provide—to the flyback converter—error signals corresponding to the desired output voltage. In some cases, this transitioning may need to occur within a standardized limit. For instance, the slew rate (or transition rate) between output voltages for a USB Type-C power adapter is set to be less than 30 mV/us. The resistor circuitry used to facilitate the transition between different output voltages may result in an increased circuit area footprint. Additionally, controlling the transition rate of the instant output voltage to a desired output rate may require extraneous external circuitry, which may further increase the circuit area footprint (and, in turn, the overall size and cost of the adapter). Therefore, a new technique that mitigates the aforementioned disadvantages is desirable.

Accordingly, at least some examples disclosed herein are directed to systems and method for providing a desired output voltage from a converter circuit (e.g., flyback converter). Specifically, the examples disclosed herein are directed to a shunt regulator circuit that is coupled to the converter circuit. The shunt regulator circuit is configured to provide an external reference signal to the converter, which may control the output of the converter circuit. In some examples, the external reference signal may be controlled using an internal reference signal (e.g., internal reference voltage) of the shunt regulator. In some examples, based on a desired voltage output, the internal reference signal may change. The transitioning of the present internal reference voltage to a new internal reference voltage may further facilitate transitioning the present output voltage to the desired output voltage at the converter circuit. Additionally, in at least some examples, the shunt regulator may be programmed to a desirable transition rate. Stated another way, the ramp-up/down rate between the present internal reference and the desired internal reference (and, in turn, the present output voltage to the desired output voltage) may be controlled.

Figure 1:
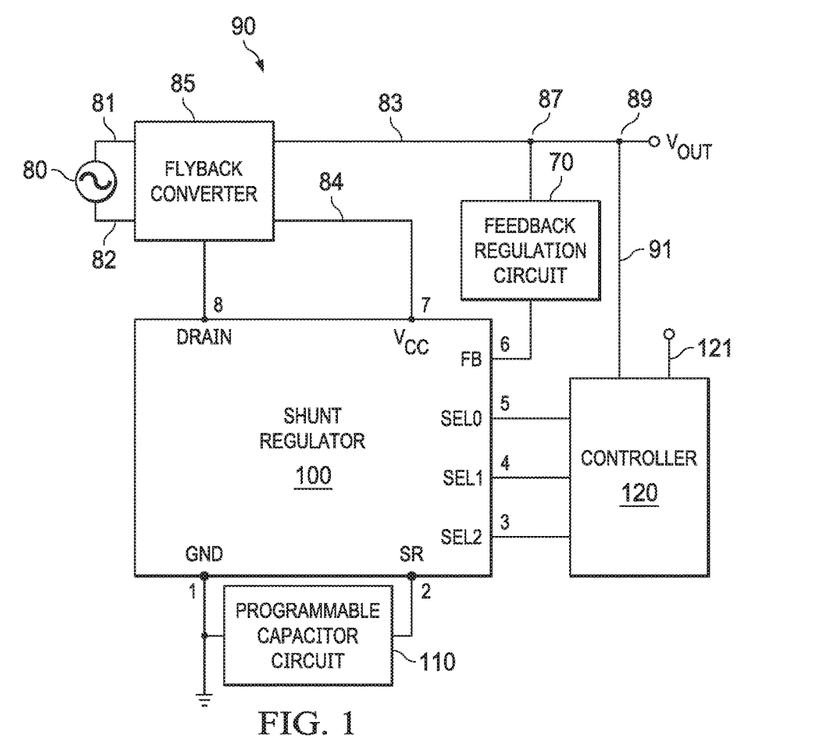
FIG. 1 depicts an illustrative programmable output AC/DC flyback converter circuit, in accordance with various examples.

FIG. 1 depicts an illustrative programmable output AC/DC flyback converter circuit ("converter circuit") 90. The converter circuit 90 includes a flyback converter 85, a shunt regulator circuit 100, programmable capacitor circuit 110, and a controller 120. In this example, the flyback converter 85 is configured to receive an AC voltage 80 through the inputs 81, 82. The flyback converter 85 outputs a voltage $V_{out}$ at the output 83. The controller 120 is configured to couple to the output 83 at the node 89 and receive $V_{out}$ through the input 91. In some examples, the controller 120 may be configured to receive a signal related, at least in part, to a new output voltage that is desired. As noted above, the internal reference voltage of the shunt regulator 100 may change based on the desired output voltage. In some examples, this may be done through input 121. For example, assume that the flyback converter 85 is presently configured to output 5V to charge a smartphone. Now, instead of the smartphone, a laptop is coupled to the flyback converter 85. In such an example, the controller 120 may receive a signal through the input 121 related to the change in the electronic device and information about the new device that is attached. Based on the identification of the new device, the controller 120 may send a signal to the shunt regulator 100 indicating to change the present internal reference voltage to the new internal reference voltage, which may further facilitate changing the $V_{out}$ based on the change in the internal reference voltage. In some examples, the new internal reference voltage may be mapped to the desired output voltage as described below.

The illustrative shunt regulator circuit 100 depicted in FIG. 1 includes 8 pins. Pin 1 may provide a ground potential to the shunt regulator 100. Pin 2 may be a soft ramp control pin, which is configured to couple to the programmable capacitor circuit 110. The soft ramp control pin (pin 2) may couple to a circuit (shown in FIG. 2) within the shunt regulator circuit 100 that may control the transition rate between the present internal reference voltage to the new internal reference voltage. The internal reference voltage may sometimes be referred to as "internal reference." Pins 3, 4, and 5 may act as the selection pins that are configured to receive a digital signal from the controller 120 (based on the identification of a new electronic device). The number of internal reference voltages may depend on the number of selectable pins (e.g., pins 3, 4, and 5). In this disclosure, the number of selectable internal reference voltages may be 8 (i.e., $2^n$, with n being the number of selectable pins). In other examples, the number "n" may vary.

Pin 6 may be a feedback pin that couples to the output 83 at the node 87 and receives a signal related to the present $V_{out}$ of the flyback converter 85. In some examples, a feedback regulation circuit 70 may be present between the node 87 and the pin 6. The feedback regulation circuit 70 may be configured to reduce the voltage level of the node 87 as it is fed-back to the shunt regulator 100. For instance, if the output of the flyback converter is 12V, feedback regulation circuit 70 may reduce it to a reduced value (as described below) compatible with the shunt regulator 100. The reduced value is based on the 12V output. In some examples, the feedback regulation circuit 70 may be present inside the shunt regulator 100. In some examples, the feedback regulation circuit 70 may include a resistor ladder circuit.

Pin 7 may receive a supply voltage ($V_{CC}$) for the shunt regulator 100. In some examples, the supply voltage may be provided by the flyback converter 85 through the wire 84. Pin 8 may be the drain pin, i.e., pin 8 may output a reference signal to the flyback converter 85 that the flyback converter 85 may use to generate $V_{out}$. In some examples, the reference signal to the flyback converter 85 is referred to as an "external reference signal" and pin 8 may be referred to as an external reference signal pin. As further described below, in some examples, the external reference signal to the flyback converter 85 is based on the internal reference voltage. In some examples, the external reference signal may follow the transition of the internal reference voltage and this change in the external reference signal may change the $V_{out}$ of the flyback converter 85.

Figures 2, 5:
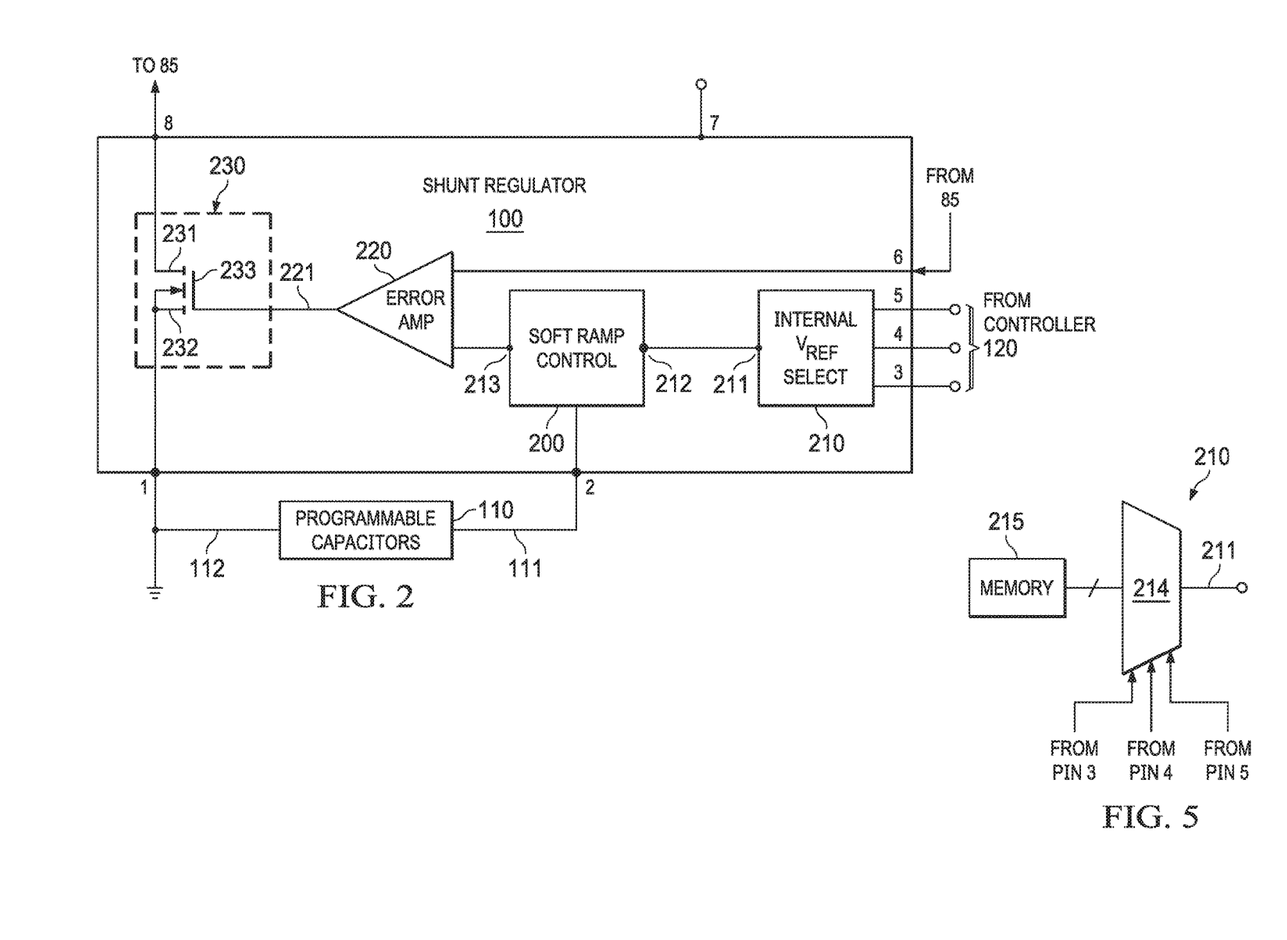
FIG. 2 depicts an illustrative shunt regulator circuit, in accordance with various examples.
FIG. 5 depicts an illustrative internal reference voltage selection circuit, in accordance with various examples.

Refer now to FIG. 2. FIG. 2 depicts an illustrative shunt regulator circuit 100. The shunt regulator circuit 100 may include an internal reference voltage selection circuit 210. The internal reference voltage selection circuit 210 may sometimes be referred to as internal $V_{REF}$ select circuit 210. The internal $V_{REF}$ select circuit 210 is configured to receive inputs from pins 3, 4, and 5. Pins 3, 4, and 5 may act as the selection pins that are configured to receive a digital signal from the controller 120 (FIG. 1) that may contain information related to the electronic device receiving the output voltage of the flyback converter 85 (FIG. 1). Based on the digital signal from the controller 120, the internal $V_{REF}$ select circuit 210 selects an internal reference voltage, which is fed to the soft ramp control circuit ("soft ramp control") 200 via the input node 212. The input node 212 of the soft ramp control 200 is coupled to the node 211 of the internal $V_{REF}$ select circuit 210.

The shunt regulator circuit 100 may also include an error amplifier 220 that is configured to receive the output of the soft ramp control 200 via the output node 213. The output of the soft ramp control 200 may sometimes be referred to as a soft ramp control output signal. The error amplifier ("error amp") 220 is also configured to receive a signal related to the present $V_{out}$ of the flyback converter 85 (FIG. 1) through the feedback pin 6. The shunt regulator circuit 100 also includes a switch 230. The switch 230, in some examples, may be a field effect transistor. The switch 230 may include a drain terminal 231, a source terminal 232, and a gate terminal 233. The gate terminal 233 couples to the error amplifier 220 through the wire 221. The source terminal 232 may couple to the ground pin 1 and the drain terminal 231 may provide a signal (e.g., external reference signal) to the pin 8. Based on the signal from pin 6 and the output node 213, the error amplifier 220 is configured to generate a drive signal in the wire 221 for the gate terminal 233 such that the drive signal generates an external reference signal at pin 8. In some examples, this external reference signal may dictate the output of the flyback converter 85. In some examples, the shunt regulator 100 may couple to the programmable capacitor circuit ("programmable capacitor") 110 through the wires 111 and 112 such that the wire 111 couples from pin 2 to the programmable capacitor 110 and the wire 112 couples the other end of the programmable capacitor 110 to the ground pin 1.

Table 1 below depicts an example mapping of the digital signal received at pins 3, 4, and 5 with the internal $V_{REF}$ and output voltage $V_{out}$. For example, if the signal received by the internal $V_{REF}$ select circuit 210 from the pins 3, 4, and 5 is 1, 0, and 1, respectively, an internal $V_{REF}$ of 1.14V may be selected by the $V_{REF}$ select circuit 210. This internal $V_{REF}$ may be supplied to the soft ramp control circuit 200. If the present internal $V_{REF}$ of the shunt regulator 100 is also 1.14V, the error amplifier 220 may check for any deviance from the corresponding $V_{out}$ by comparing 1.14V with the signal received at the pin 6 (which is related to $V_{out}$). Based on the comparison, the error amplifier 220 may provide a gate drive signal at wire 221 to drive the switch 230 such that the external reference signal at pin 8 corresponds to the output voltage of 19V. Stated another way, this external reference signal may facilitate the $V_{out}$ of 19V.

TABLE 1

| Pin 3 | Pin 4 | Pin 5 | Internal $V_{REF}$ | Output voltage ($V_{out}$) |
|---|---|---|---|---|
| 1 | 1 | 1 | 300 mV | 5 V |
| 0 | 0 | 1 | 420 mV | 7 V |
| 0 | 1 | 1 | 540 mV | 9 V |
| 1 | 0 | 0 | 720 mV | 12 V |
| 0 | 1 | 0 | 900 mV | 15 V |
| 1 | 0 | 1 | 1.14 mV | 19 V |
| 0 | 0 | 0 | 1.20 mV | 20 V |
| 1 | 1 | 0 | 1.44 mV | 24 V |

In some examples, the present internal $V_{REF}$ may not be equal to the internal $V_{REF}$ selected by the $V_{REF}$ select circuit 210 (based on the signal received by pins 3, 4, and 5). For example, assume the present internal $V_{REF}$ is 1.14V and pins 3, 4, and 5 receive 1, 1, and 1 from the controller 120 (FIG. 1). Receiving 1, 1, 1, at pins 3, 4, 5 may mean that the controller 120 is indicating the shunt regulator 100 to ramp-down the output voltage from 19V to 5V, which may be done by ramping-down the internal reference voltage of the shunt regulator 100 from 1.14V to 300 mV. In such a scenario, the soft ramp control circuit 200 receives a new internal $V_{REF}$. As further described below, the soft ramp control circuit 200, following receiving the new internal $V_{REF}$, may be configured to ramp-down the internal $V_{REF}$, which may change the present internal $V_{REF}$ (1.14V) of the shunt regulator 100 to the new internal $V_{REF}$ (5V). In some examples, the rate of this ramp-down operation may be controlled by the programmable capacitor 110. The transition (i.e., ramp-up/down) operation is described in FIG. 3.

Figure 3:
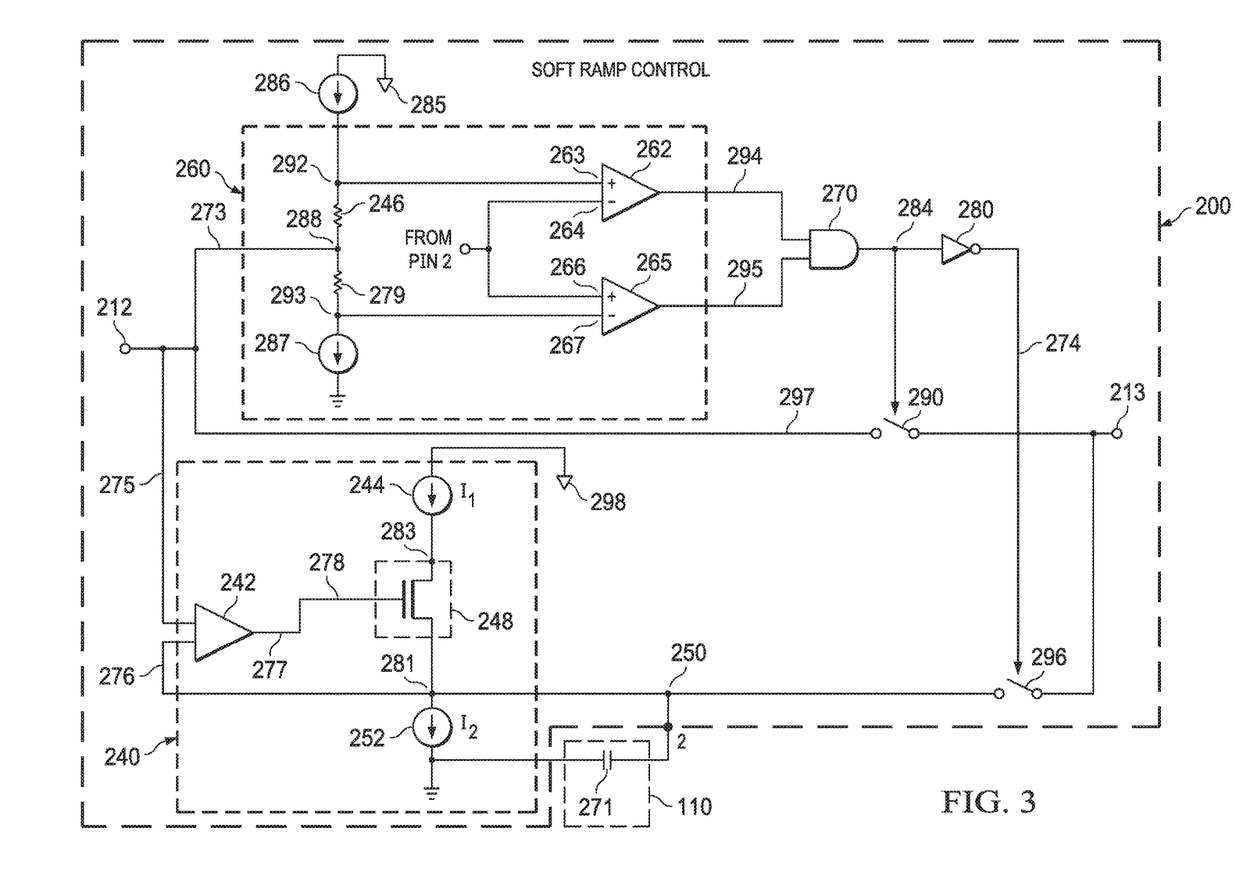
FIG. 3 depicts an illustrative soft ramp control, in accordance with various examples.

Refer now to FIG. 3. FIG. 3 depicts an illustrative soft ramp control 200. The soft ramp control 200 couples to pin 2 at node 250 and includes the input node 212 and the output node 213. The soft ramp control 200 may also include a comparison circuit 260, a logic gate 270, a logic gate 280, switches 290, 296, and a current limited buffer 240. The soft ramp control 200 may also couple to the programmable capacitor circuit 110. In this example, the programmable capacitor circuit 110 includes a capacitor 271. In some examples, the comparison circuit 260 may include a window comparator. In such an example, the comparison circuit 260 may include a first comparator 262 and a second comparator 265. The first comparator 262 may be configured to receive the signal at pin 2 as an input at the terminal 264. The terminal 263 may couple to the node 288 via a resistor 246. The node 288 may couple to the input node 212, such that the terminal 263 receives, at least in part, the signal at the input node 212. The second comparator 265 may be configured to receive the signal at pin 2 as an input at the terminal 266. The terminal 267 may couple to the node 288 via a resistor 279. The node 288 may couple to the input node 212 through the wire 273, such that the terminal 267 receives, at least in part, the signal at the input node 212. In some examples, a voltage source 285 (not expressly shown) may be coupled to a current source 286, which may further couple to the node 292 through the current source 286. A ground potential may be coupled to the node 293 through a current source 287. For example, the values of the current sources 286, 287 may be selected such that the signal at the node 292 is the input received at the input node 212 plus 10 mV and the signal at the node 293 is the input received at the input node 212 minus 10 mV. If the signal received at the terminals 264, 266 is within the window dictated by the terminals 263, 267, the comparison circuit 260 generates a digital high signal at the wires 294 and 295. However, if the signal received at the terminals 264, 266 is not within the window dictated by the terminals 263, 267, the comparison circuit 260 generates a digital low signal at the wires 294 and 295. (In some examples, the comparison circuit 260 may include differential amplifiers and analog-to-digital converters in lieu of comparators.)

In some examples, the current limited buffer 240 may include an amplifier 242 coupled to a switch 248 through the wire 278. In some examples, the amplifier 242 may be a unity gain amplifier. The amplifier 242 is configured to receive inputs through the wires 275 and 276. The wire 275 may be coupled to the input node 212 such that one of the inputs of the amplifier 242 is the signal at the input node 212. The wire 276 may couple to the node 281 and receive the signal from pin 2 and supply the signal to the amplifier 242. The current limited buffer 240 may also include a first current source 244 and a second current source 252. The first current source 244 may couple to the switch 248 at the node 283. The other end of the switch 248 may be coupled to the node 281. The second current source 252 may couple to node 281 and a ground potential. The first current source 244 may also be coupled to a power source 298. The node 281 may further couple to the switch 296. The input node 212 may couple to the output node 213 using the wire 297 via the switch 290. The amplifier 242 may generate its output on the wire 277 and drive the switch 248 to turn on or turn off.

The operation of the shunt regulator 100 is now described using FIGS. 1, 2, and 3. In steady state condition, the signal at pin 2 includes the present internal $V_{REF}$ of the shunt regulator 100. Per the signal sent by input 121, the controller 120 sends a digital signal identifying the new internal $V_{REF}$ (by the internal $V_{REF}$ select circuit 210) needed at the shunt regulator 100, and, in turn, the $V_{out}$ needed at the output 83. For explanation's sake, assume that pins 3, 4, and 5 receive a digital signal that corresponds to the new internal $V_{REF}$ being substantially equal to the present internal $V_{REF}$. In such a case, the comparison circuit 260 receives the present internal $V_{REF}$ at the terminals 264, 266 (through pin 2). The comparison circuit 260 also receives a signal related to the selected internal $V_{REF}$ in the circuit 210 at the terminals 263 and 267. The comparison circuit 260, in such a case (i.e., present internal $V_{REF}$ substantially equal to the new internal $V_{REF}$) generates a digital high ("1") signal on each of the wires 294, 295, meaning that the internal $V_{REF}$ received by the internal $V_{REF}$ select circuit 210 is within threshold, i.e., within the window dictated by the comparison circuit 260. The digital high signal at 294, 295 may further signal a digital high signal at the node 284, which may turn on the switch 290 and turn off the switch 296. Refer now to FIG. 5, which depicts an illustrative $V_{REF}$ select circuit 210. In some examples, the $V_{REF}$ select circuit 210 may include a multiplexer 214 that receives inputs from pins 3, 4, and 5. The multiplexer 214, based on the inputs received from the pins 3, 4, and 5, selects a corresponding internal $V_{REF}$ value stored in a memory 215 and produces it at the node 211. In some examples, the memory 215 may be a cache memory present inside the multiplexer 214. In some examples, internal $V_{REF}$ select circuit 210 may include a resistor ladder and a reference voltage in place of the memory 215. In such an example, the combination of resistor ladder and the reference voltage may couple to the multiplexer and based on the inputs received from the pins 3, 4, and 5, the resistance of the resistor ladder may be changed to generate the corresponding internal $V_{REF}$.

Figure 4:
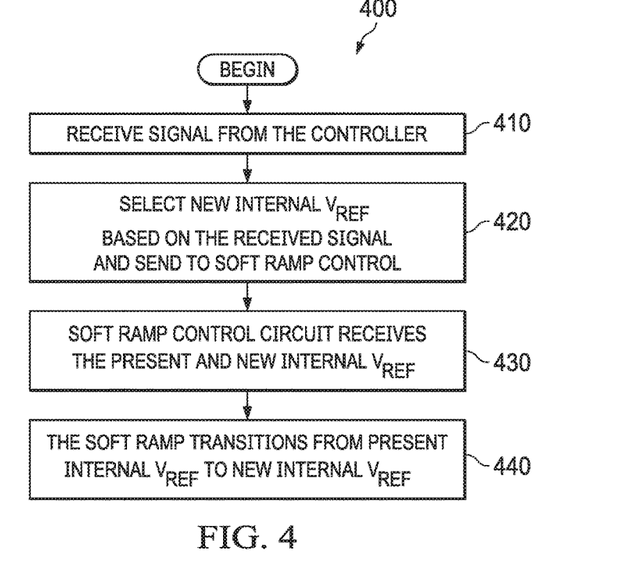
FIG. 4 depicts an illustrative method performed by the shunt regulator circuit, in accordance with various examples.

FIG. 4 depicts a method 400 that may be performed by the shunt regulator 100 to transition from the present internal $V_{REF}$ to the new internal $V_{REF}$. FIG. 4 is now described in tandem with FIGS. 2 and 3. As noted above, in steady state condition, the signal at pin 2 includes the present internal $V_{REF}$ of the shunt regulator 100. Per the signal sent by input 121 (step 410), the controller 120 sends a digital signal identifying the internal $V_{REF}$ (by the internal $V_{REF}$ select circuit 210) needed at the shunt regulator 100, and, in turn, the $V_{out}$ needed at the output 83 (step 420). For example, assume that pins 3, 4, and 5 receive a digital signal that corresponds to a new internal $V_{REF}$ that is higher than the present internal $V_{REF}$. The method 400 then proceeds to step 430. In such a case, the comparison circuit 260 (present in the soft ramp control circuit 200) receives a signal related to the new internal $V_{REF}$ at the terminals 263, 267. The comparison circuit 260 also receives the present internal $V_{REF}$ at the terminals 264 and 266. Since the present internal $V_{REF}$ is lower than the new internal $V_{REF}$, the comparison circuit 260 may generate a digital low ("0") signal at the wires 294, 295, meaning that the internal $V_{REF}$ received by the internal $V_{REF}$ select circuit 210 is output of the window dictated by the comparison circuit 260. The digital high signal at 294, 295 may further signal a digital low signal at the node 284, which may turn off the switch 290 and turn on the switch 296.

The method 400 then may proceed to the step 440. Following the turning on of the switch 296, the output node 213 begins receiving the signal at node 250. The current limited buffer 240 receives the signal at the input node 212 (i.e., the new internal $V_{REF}$) through the wire 275 and receives the present internal $V_{REF}$ through the wire 276. Based on the inputs, the amplifier 242 drives the switch 248 to turn on. Following turning on the switch 248, the total sum of current present at the node 281 (i.e., I1-I2), starts charging the capacitor 271. The charging (i.e., ramp-up) effect may be noticed at the node 250 (that couples to pin 2). The capacitor 271 is charged until the voltage at the node 250 is substantially equal to the new internal $V_{REF}$, during which time, the comparison circuit 260 at the terminals 264, 266 receives the voltage at pin 2. Since the new voltage at pin 2 is substantially equal to the signal at input node 212 (i.e., the present internal $V_{REF}$ is substantially equal to the new internal $V_{REF}$), the comparison circuit 260, as described above, sends a digital high signal to the logic gate 270, which further turns on the switch 290 and turns off the switch 296.

Still referring to FIG. 3, assume that pins 3, 4, and 5 (FIG. 2) receive a digital signal that corresponds to a new internal $V_{REF}$ that is lower than the present internal $V_{REF}$. In such a case, the comparison circuit 260 receives a signal related to the new internal $V_{REF}$ at the terminals 263, 267. The comparison circuit 260 also receives the present internal $V_{REF}$ at the terminals 264 and 266. Since the present internal $V_{REF}$ is higher than the new internal $V_{REF}$, the comparison circuit 260 may generate a digital low ("0") signal at the wires 294, 295, meaning that the internal $V_{REF}$ received by the internal $V_{REF}$ select circuit 210 is the output of the window dictated by the comparison circuit 260. The digital high signal at 294, 295 may further signal a digital low signal at the node 284, which may turn off the switch 290 and turn on the switch 296.

Following the turning on of the switch 296, the output node 213 begins receiving the signal at node 250. The current limited buffer 240 receives the signal at the input node 212 (i.e., the new internal $V_{REF}$) through the wire 275 and receives the present internal $V_{REF}$ through the wire 276. Based on the inputs, the amplifier 242 drives the switch 248 to turn off. Following turning off the switch 248, the second current source 252 (I2), starts discharging the capacitor 271. The discharging effect may be noticed at the node 250 (that couples to pin 2). The capacitor 271 is discharged until the voltage at the node 250 is substantially equal to the new internal $V_{REF}$, during which time, the comparator 260 at the terminals 264, 266 receives the voltage at pin 2. Since the new voltage at pin 2 is substantially equal to the signal at input node 212 (i.e., the present internal $V_{REF}$ is substantially equal to the new internal $V_{REF}$), the comparison circuit 260, as described above, sends a digital high signal to the logic gate 270, which further turns on the switch 290 and turns off the switch 296.

Now refer to FIG. 2. As noted above, during ramp-up/down scenario, the signal at the output node 213 charges and discharges, respectively. The instantaneous signal at the output node 213 may be fed to the error amplifier 220, which may further generate, by comparing the instantaneous signal at pin 6, an error signal at the wire 221. The error signal further drives the switch 230 such that the external reference signal at pin 8 changes, i.e., when the ramp-up and ramp-down process occurs, the external reference signal at pin 8 also changes at the substantially same transition rate as the present internal $V_{REF}$ transitions to the new internal $V_{REF}$ In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The term "substantially equal," as used herein, means that one value is within plus or minus 20% of another value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A shunt regulator, comprising:
    a plurality of selection pins configured to receive a digital signal;
    an internal reference voltage selection circuit coupled to the plurality of the selection pins, the internal reference voltage selection circuit configured to select a first internal reference voltage of the shunt regulator based on the digital signal received by the plurality of selection pins; and
    a soft ramp control circuit coupled to a soft ramp control pin that is configured to receive a second internal reference voltage and generate a soft ramp control output signal, the soft ramp control circuit comprising:
        a comparison circuit configured to receive and compare the first internal reference voltage and the second internal reference voltage; and
        a current limited buffer coupled to the comparison circuit and configured to change the second internal reference voltage to a third internal reference voltage at the soft ramp control pin in response to the comparison.

2. The shunt regulator of claim 1, wherein the current limited buffer comprises:
    a first constant current source;
    a second constant current source;
    a switch coupled to the first and the second constant current sources; and
    an amplifier, wherein the amplifier is configured to receive the first internal reference voltage and the second internal reference voltage and to generate a drive signal based on the first and the second internal reference voltage.

3. The shunt regulator of claim 2, wherein, based on the drive signal, the amplifier is configured to turn off the switch such that the second constant current source discharges the second internal reference voltage at the soft ramp control pin to generate the third reference voltage.

4. The shunt regulator of claim 2, wherein, based on the drive signal, the amplifier is configured to turn on the switch such that both the first and the second constant current sources charge the second internal reference voltage at the soft ramp control pin to generate the third reference voltage.

5. The shunt regulator of claim 1, wherein the soft ramp control pin is configured to couple to a capacitor.

6. The shunt regulator of claim 1, wherein the comparison circuit comprises:
    a first comparator; and
    a second comparator, wherein the first and second comparators are configured to receive the first and the second internal reference voltages.

7. The shunt regulator of claim 1, further comprising an error amplifier that is configured to generate an error signal based on the soft ramp control output signal.

8. A method, comprising:
    receiving, by a controller coupled to a plurality of selection pins, a digital signal;
    selecting, by an internal reference voltage selection circuit coupled to the plurality of selection pins, a first internal reference voltage based on the digital signal;
    receiving, by a soft ramp control circuit coupled to a soft ramp control pin and to the internal reference voltage selection circuit, a second internal reference voltage at the soft ramp control pin; and
    transitioning, by a current limited buffer present in the soft ramp control circuit, the second internal reference voltage to a third internal reference voltage.

9. The method of claim 8, wherein the third internal reference voltage is substantially equal to the second internal reference voltage.

10. The method of claim 8, further comprising:
    receiving, by a comparison circuit, the first and the second internal reference voltages; and
    in response to a comparison performed by the comparator, sending a signal to turn on a switch coupled to the current limited buffer.

11. The method of claim 8, wherein the current limited buffer comprises a first constant current source, a second constant current source, a switch coupled to the first and the second constant current sources, and an amplifier, and further comprising:
    receiving, by the amplifier, the first internal reference voltage and the second internal reference voltage; and
    generating a drive signal based on the first and the second internal reference voltage.

12. The method of claim 11, further comprising, based on the drive signal, closing the switch and transitioning the second internal reference voltage to the third internal reference voltage.

13. The method of claim 11, further comprising, based on the drive signal, opening the switch and transitioning the second internal reference voltage to the third internal reference voltage.

14. The method of claim 8, wherein the soft ramp control pin couples to a capacitor.

15. A shunt regulator, comprising:
    an internal reference voltage selection circuit coupled to a plurality of selection pins; and
    a soft ramp control circuit coupled to the internal reference voltage selection circuit and to a soft ramp control pin, the soft ramp control circuit comprising:
        a comparison circuit; and
        a current limited buffer, the current limited buffer coupled to the comparison circuit and to a capacitor.

16. The shunt regulator of claim 15, wherein the current limited buffer further comprises:
    an amplifier;
    a switch coupled to the amplifier, the switch comprising a gate terminal, a first terminal, and a second terminal;
    a first constant current source coupled to the first terminal; and
    a second constant current source coupled to the second terminal, wherein the second terminal is coupled to the capacitor.

17. The shunt regulator of claim 15, wherein the internal reference voltage selection circuit is configured to select a first internal reference voltage of the shunt regulator based on a digital signal received by the plurality of selection pins.

* * * * *